(12) United States Patent
Tsuchiya

(10) Patent No.: US 6,184,493 B1
(45) Date of Patent: Feb. 6, 2001

(54) VERTICAL DIFFUSION BONDING APPARATUS

(75) Inventor: Masaki Tsuchiya, Yokkaichi (JP)

(73) Assignee: Daido Tokushuko Kabushiki Kaisha (JP)

(*) Notice: Under 35 U.S.C. 154(b), the term of this patent shall be extended for 0 days.

(21) Appl. No.: 09/376,365

(22) Filed: Aug. 18, 1999

(30) Foreign Application Priority Data

Aug. 19, 1998 (JP) .................................................. 10-233034

(51) Int. Cl.$^7$ .................................................. B23K 13/01
(52) U.S. Cl. .......................... 219/161; 219/659; 219/607; 228/44.5; 228/212
(58) Field of Search .................... 228/212, 44.5, 228/49.3; 219/603, 605, 607, 615–617, 643, 651, 659

(56) References Cited

U.S. PATENT DOCUMENTS

| | | | |
|---|---|---|---|
| 1,775,311 | * | 9/1930 | Halle ..................................... 19/60 R |
| 2,054,375 | * | 9/1936 | Halle ..................................... 228/4.1 |
| 3,120,138 | * | 2/1964 | Ronay ................................... 228/44.5 |
| 3,578,233 | * | 5/1971 | Meister et al. ........................ 228/5.1 |
| 3,618,845 | * | 11/1971 | Totten ................................. 228/44.3 |
| 3,711,938 | * | 1/1973 | Warren et al. ........................ 228/213 |
| 4,214,692 | * | 7/1980 | Le Garfe et al. .................... 228/44.3 |
| 4,418,860 | * | 12/1983 | LaForce ............................... 228/196 |
| 5,975,405 | * | 11/1999 | Tsuchiya et al. .................... 228/44.5 |

FOREIGN PATENT DOCUMENTS 0 882 539 A2    12/1998 (EP) .

* cited by examiner

Primary Examiner—Samuel M. Heinrich
(74) Attorney, Agent, or Firm—Bacon & Thomas, PLLC

(57) ABSTRACT

A vertical diffusion bonding apparatus is provided with a lower block, a pressurizing jig which is fitted to a metal pipe supplied from an upper position, and a pressurizing mechanisms stood erect on the lower block. The lower metal pipe is held by the lower block and the pressurizing jig bonded to the metal pipe is attracted toward the lower block by using the pressurizing mechanisms. Thus, the metal pipe which is supplied from an upper position is pressed against the lower metal pipe.

4 Claims, 8 Drawing Sheets

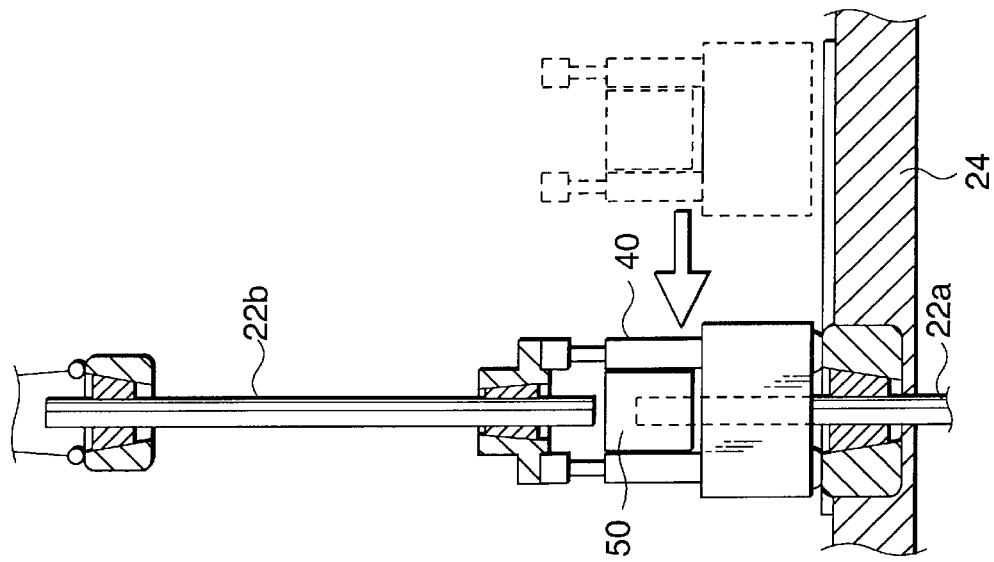
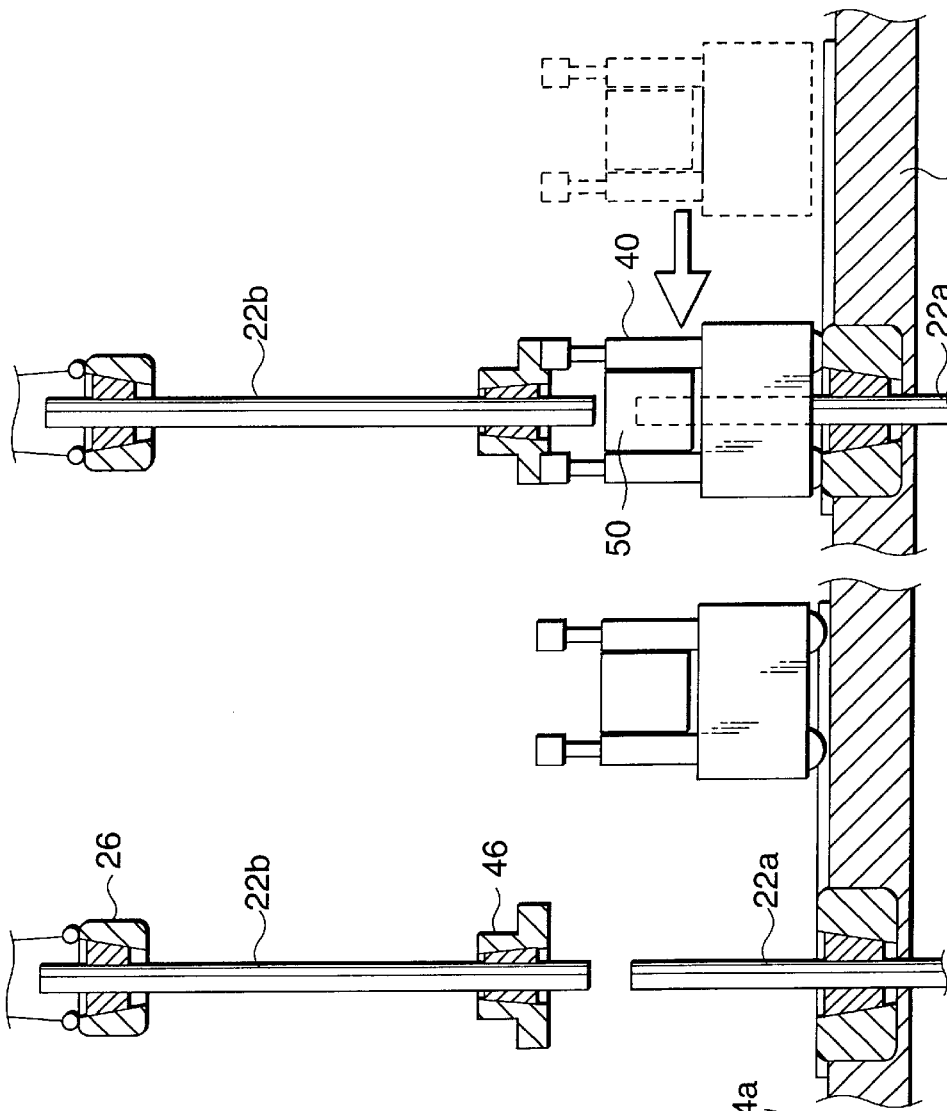
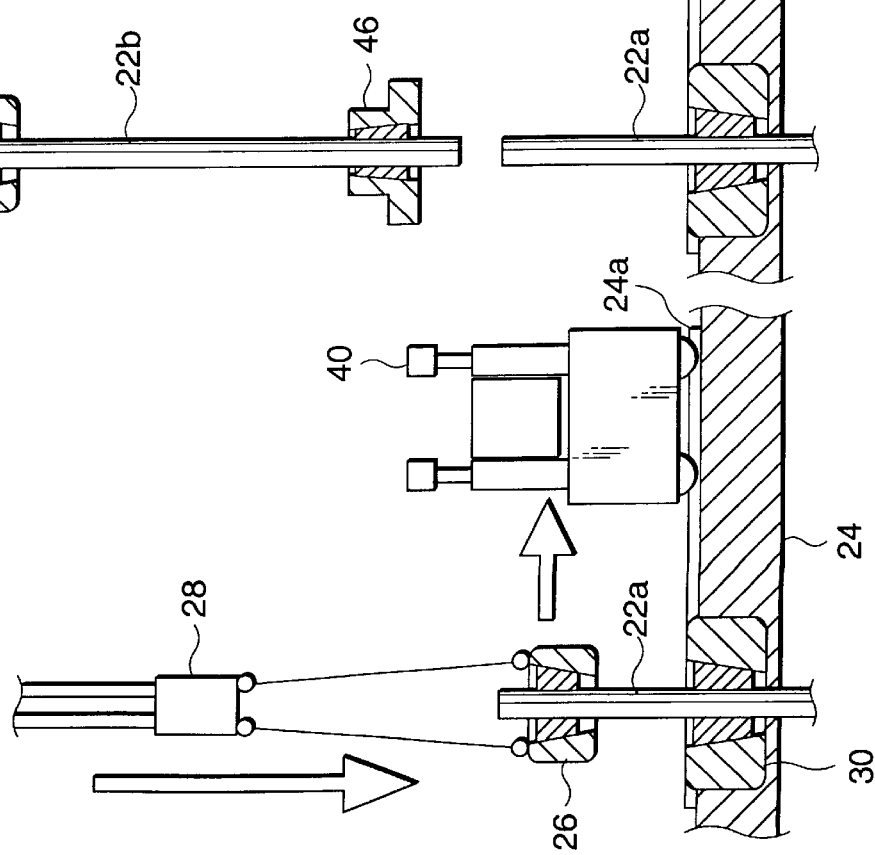

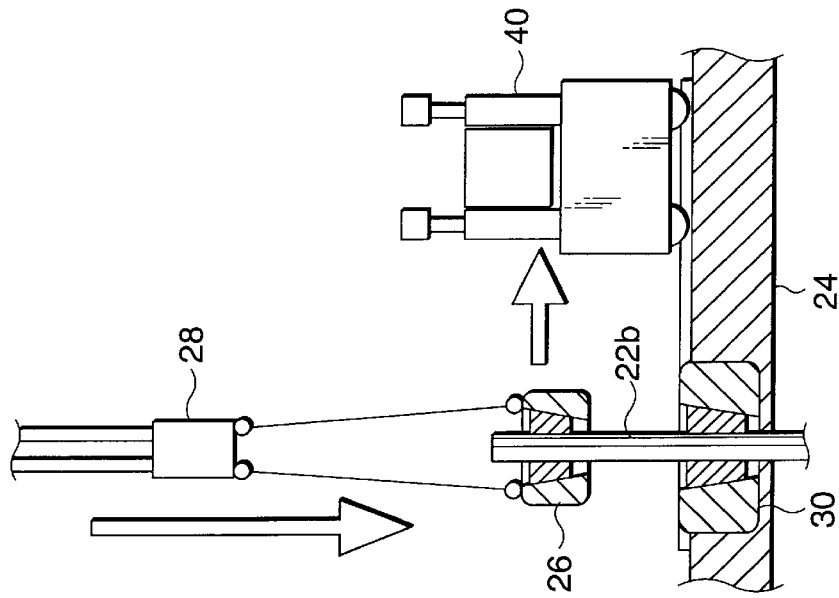
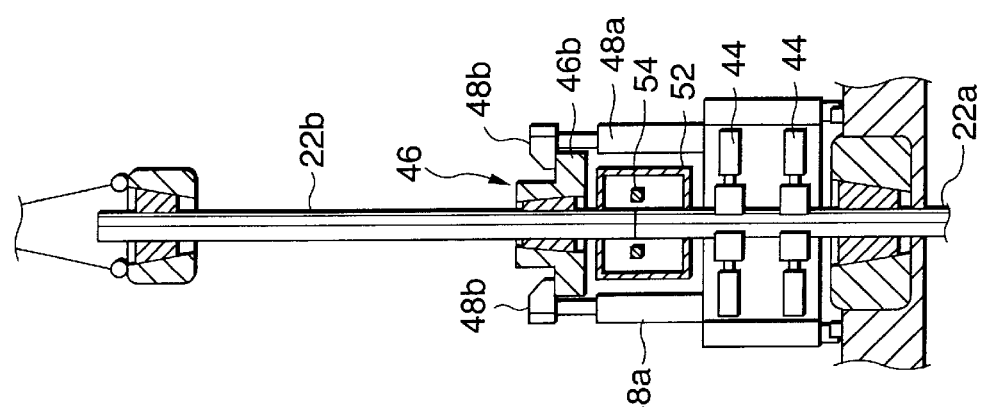
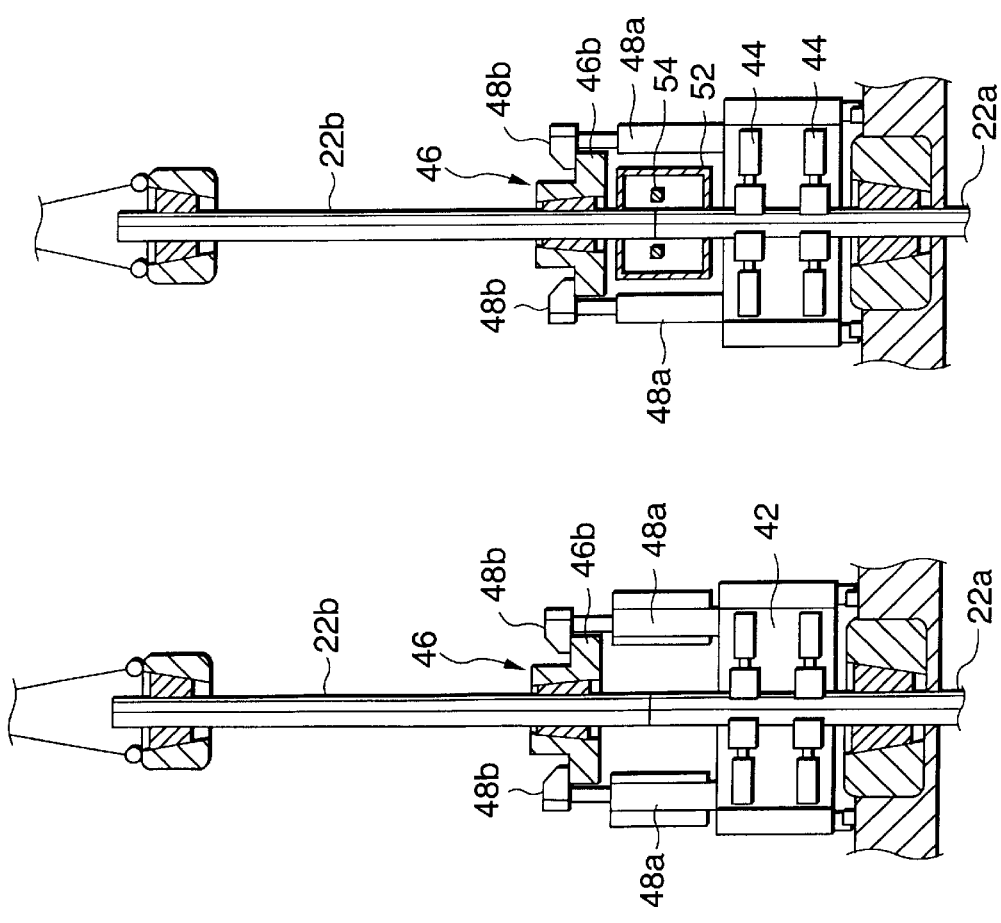

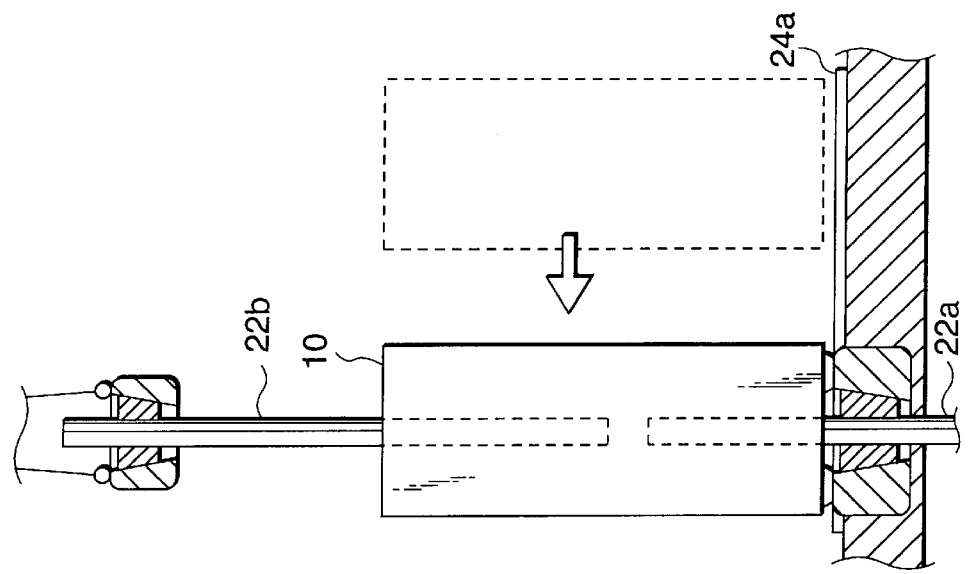
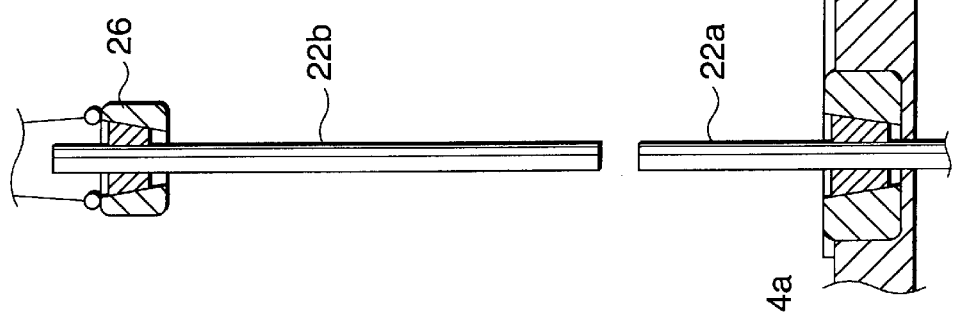
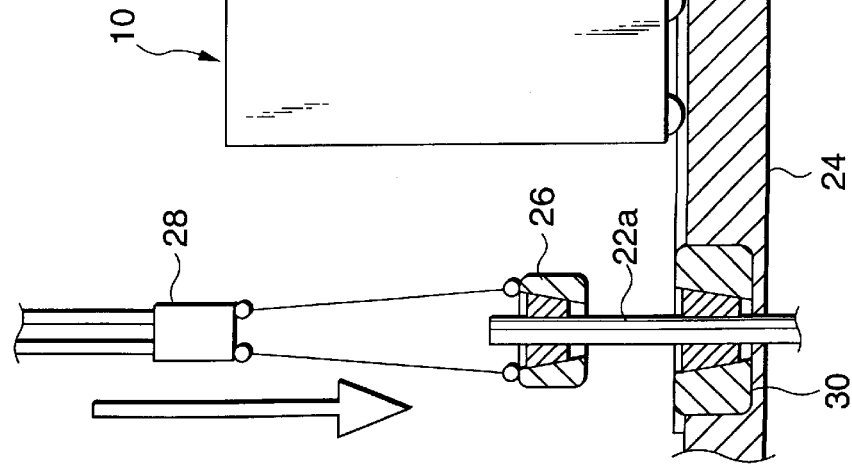

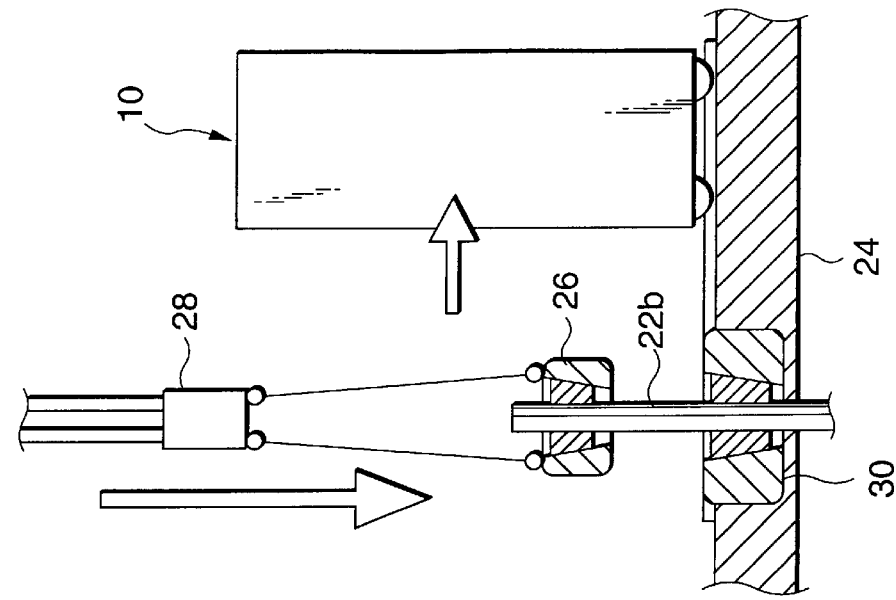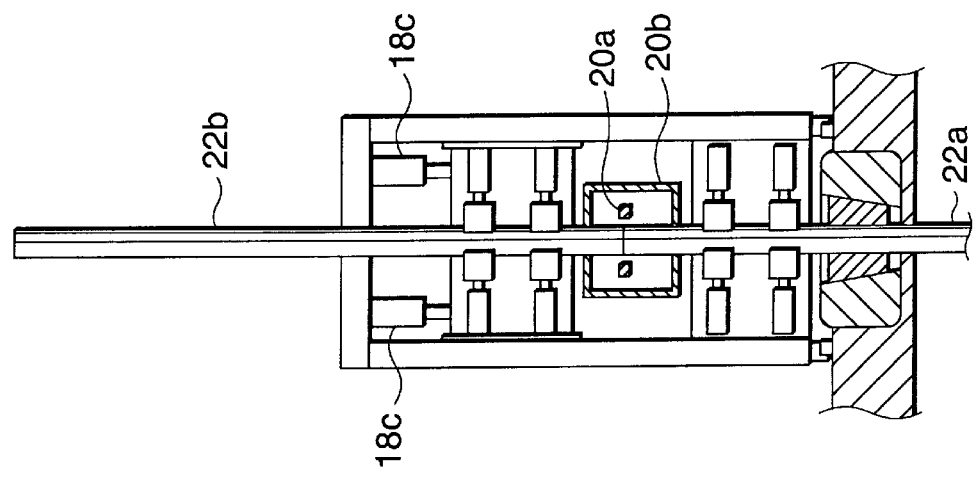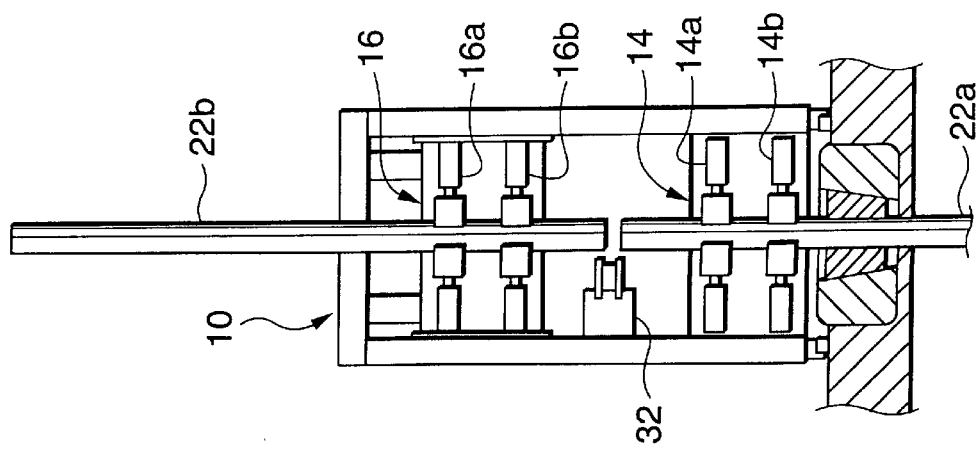

VERTICAL DIFFUSION BONDING APPARATUS

BACKGROUND OF THE INVENTION

1. Field of the Invention

The present invention relates to a vertical diffusion bonding apparatus, and particularly to a vertical diffusion bonding apparatus serving as a preferred apparatus for diffusion-bonding metal pipes, such as oil well tubes for drilling, tubing or casings disposed vertically.

2. Description of the Related Art

In a diffusion bonding method, bonding members to be bonded to each other are held in close contact with each other, and pressed to a degree which does not cause plastic deformation, so that the bonding members are bonded by using diffusion of atoms which takes place in the interface between the bonded surfaces.

The diffusion bonding method, the solid-phase diffusion bonding method and a liquid-phase diffusion bonding method are known. In a solid-phase diffusion bonding method, members to be bonded are brought into direct and close contact with each other to cause atom elements to be diffused while the solid state is maintained. In the liquid-phase diffusion bonding method, an insertion material having a low melting point is inserted into a space between the members, and then, the insertion member is temporarily melted to cause dissipation of specific elements in the liquid phase in the member and isothermal solidification to occur to bond the members to each other.

The diffusion bonding method is different from the mechanical bonding method, such as a bolt fixing method and a rivet bonding method, in that saving of materials and reduction in the number of man-hours are obtained. Moreover, bonding exhibiting satisfactory bonding strength, airtightness, pressure resistance and the like can be obtained. In addition, the time required to produce each bonding is shorter than time required for the welding method. Since the above-mentioned advantages can be obtained, the diffusion bonding method has been widely used as a method of bonding oil well tubes for drilling oil, anti-corrosion pipes for use in the chemical industry, line pipes for transporting crude oil and elongated stainless steel pipes for use in seawater heat exchangers.

Usually oil wells exist at positions thousands of meters underground. Therefore, when oil well tubes are embedded underground, metal pipes each having a length of 10 meters to 15 meters must sequentially be bonded to one another, and then moved downwards in a vertical hole formed underground. A vertical diffusion bonding apparatus has been employed to diffusion-bond the oil well tubes to one another, the apparatus being arranged to dispose metal pipes in the vertical direction and perform diffusion bonding while supplying the metal pipes from an upper position to the lower position.

Many types of vertical diffusion bonding apparatuses have been suggested. For example, one diffusion bonding apparatus has been suggested in EP 0 882 539 A2. The apparatus incorporates a lower block for holding a lower pipe member and an upper block for holding an upper pipe member and pressing the held upper pipe member against the lower pipe member. In the apparatus, an elevating member for holding the upper pipe member is moved downwards by using three or more hydraulic cylinders so as to press the upper pipe member against the lower pipe member.

FIG. 9 is a schematic view showing a vertical diffusion bonding apparatus having a structure similar to prior art diffusion bonding apparatus. Referring to FIG. 9, the vertical diffusion bonding apparatus 10 is provided with a lower block 14, an upper block 16, a pressurizing mechanism 18 and a heating mechanism 20.

The lower block 14 is secured to the lower portions of four frames 18a. Two lower clamping mechanisms 14a and 14b disposed apart from each other for a predetermined distance are provided on the lower block 14. A metal pipe (a lower pipe member) 22a disposed at a lower position is held at two positions.

The upper block 16 can move vertically in the perpendicular direction because the upper block 16 is slidably disposed above the frames 18a through sliders 16c. Two upper clamping mechanism 16a and 16b disposed apart from each other for a predetermined distance are provided for the upper block 16 so that a metal pipe (an upper pipe member) 22b supplied from an upper position is held at two positions.

The pressurizing mechanism 18 has four frames 18a, a main beam 18b, a holding beam (not shown) secured to the main beam 18b and three pressurizing cylinders 18c. The three pressurizing cylinders 18c are disposed at angular intervals of about 120° to surround the metal pipe 22b. The ends of the pressurizing cylinders 18c are secured to the holding frame (not shown), while the other ends are secured to the upper block 16.

The heating mechanism 20 has a two-piece heating coil 20a for induction-heating an area in the vicinity of the interface between the metal pipes 22a and 22b to be bonded; and two-piece shield chamber 20b for maintaining a predetermined atmosphere in the vicinity of the foregoing interface. Wheels 18d are disposed at the lower ends of the frames 18a. Thus, the overall body of the vertical diffusion bonding apparatus 10 is able to move forwards/rearwards along rails 24a provided for a base frame 24.

The metal pipe 22a and 22b are diffusion-bonded to each other by using the vertical diffusion bonding apparatus 10 shown in FIG. 9 in accordance with the following procedure. As shown in FIG. 10A, which is a side view, the vertical diffusion bonding apparatus 10 is retracted rearwards (in the right-hand direction in FIG. 10A) along the rails 24a provided on the base frame 24. The metal pipe 22a held by a tube clamp 26 is moved downwards by using a crane 28 and held by a tube clamp 30 secured to the base frame 24.

Then, as shown in FIG. 10B, the tube clamp 26 which was holding the metal pipe 22a is released, and then the tube clamp 26 is secured to the other metal pipe 22b that is to be bonded to the metal pipe 22a. Then, the crane 28 (not shown in FIG. 10B) is operated to move the metal pipe 22b to a position above the metal pipe 22a.

At this time, the metal pipe 22a and the metal pipe 22b are not brought into contact with each other, that is, they are separated from each other by a predetermined distance. As shown in FIG. 10C, the metal pipes 22a and 22b are moved to the central portion of the vertical diffusion bonding apparatus 10 by moving the vertical diffusion bonding apparatus 10 forwardly along the rails 24a (in the left-hand direction in FIG. 10C).

Then, as shown in FIG. 11A which is a front view, the lower clamping mechanism 14a and 14b provided for the lower block 14 is secured to the metal pipe 22a. Also, the upper clamping mechanism 16a and 16b provided by the upper block 16 holds the metal pipe 22b at an upper position. Then the tube clamp 26 is released. If an end surface of the metal pipe 22a or the metal pipe 22b has a flaw, such as a nick, an end-surface finishing machine 32 associated with the vertical diffusion bonding apparatus 10 may be operated to flatten the end surface of the metal pipe 22a or the metal pipe 22b.

Then, as shown in FIG. 11B, the pressurizing cylinders 18c are operated to press the metal pipe 22b against the metal pipe 22a. Then, the two-piece heating coil 20a is moved to a position adjacent to the interface between the surfaces to be bonded, and then the portion in the vicinity of the interface between the bonded surfaces is covered with the shield chamber 20b. Then, a purging operation using inert gas is performed. Moreover, high frequency waves are applied to the heating coil 20a so as to heat the interface between the surfaces to be bonded to a predetermined temperature. Thus, the metal pipes 22a and 22b are diffusion-bonded.

After a predetermined time has elapsed and thus the temperature of the interface between the bonded surfaces has been sufficiently lowered, the shield chamber 20b and the heating coil 20a are removed. Then, the lower clamping mechanism 14a and 14b and the upper clamping mechanism 16a and 16b are released.

As shown in FIG. 11C which is a side view, the vertical diffusion bonding apparatus 10 is retracted rearwards (in the right-hand direction in FIG. 11C). Moreover, the tube clamp 26 is again secured to the upper portion of the metal pipe metal pipe 22b. Then, the tube clamp 30 of the base frame 24 is released. Then, the crane 28 is operated to downwardly move the metal pipe 22b to a predetermined position, and then the metal pipe 22b is secured by using the tube clamp 30.

Thus, one cycle of the bonding operation is completed. When the processes shown in FIGS. 10A to 11C are sequentially repeated, a metal pipe having a length of thousands of meters can be embedded underground.

However, the vertical diffusion bonding apparatus 10 shown in FIG. 9 has the structure that the lower metal pipe 22a and the metal pipe 22b which is supplied from an upper position are held by the lower clamping mechanism 14a and 14b and the upper clamping mechanism 16a and 16b. Therefore, there arises a problem in that the overall structure of the vertical diffusion bonding apparatus 10 becomes somewhat complicated.

Moreover, the metal pipe 22b, which is supplied from an upper position, is secured by the upper clamping mechanism 16a and 16b, and then is abutted against the lower metal pipe 22a. Therefore, if the axes of the metal pipe 22a and the metal pipe 22b are slightly deviated from each other in the horizontal direction, the overall body of the upper block 16 must be moved horizontally. Thus, there arises a problem in that a somewhat complicated adjustment operations are required.

If the axes of the metal pipe 22a and the metal pipe 22b are slightly inclined from each other, the interface between the bonded surfaces are not in uniform contact. In this case, a uniform bonding pressure cannot be applied to the overall interface between the surfaces to be bonded. To prevent the above-mentioned undesirable state, the overall inclination of the upper block 16 for holding the metal pipe 22b located at the upper position must be adjusted. Thus, there arises a problem in that a somewhat complicated adjustment operation is required.

SUMMARY OF THE INVENTION

It is an object of the present invention to provide a vertical diffusion bonding apparatus having a simple overall structure and capable of easily performing horizontal position adjustments and adjustment of the inclination between a lower metal pipe and a metal pipe which is supplied from an upper position.

According to the present invention, there is provided a vertical diffusion bonding apparatus for supplying metal pipes from an upper position to a lower position, the vertical diffusion bonding apparatus comprising: a lower block for holding a lower metal pipe; a pressurizing jig detachably attachable to a metal pipe supplied from an upper position, and a pressurizing mechanism provided on the lower block so as to engage and draw the pressurizing jig toward the lower block.

The vertical diffusion bonding apparatus according to the present invention and having the above-mentioned structure is arranged such that the lower metal pipe is held by the lower block. Moreover, the pressurizing jig is fitted to the metal pipe which is supplied from the upper position. The pressurizing jig is drawn toward the lower block by using the pressurizing mechanism mounted vertically on the lower block. Thus, the metal pipe which is supplied from an upper position is pressed against the lower metal pipe. Therefore, the upper block for holding the metal pipe which is supplied from an upper position can be omitted from the structure. As a result, the overall structure of the vertical diffusion bonding apparatus can be simplified.

The horizontal movement of the metal pipe supplied from an upper position is not limited when the metal pipe supplied from any upper position is drawn toward the lower block. Therefore, when the metal pipe which is supplied from an upper position and the lower metal pipe are abutted against each other, the horizontal position adjustment can easily be performed.

The direction of the axis of the metal pipe supplied from an upper position is not limited. Therefore, slight inclination of the interface between the pipe which is supplied from an upper position and the lower pipe can automatically be eliminated when the metal pipe which is supplied from an upper position is pressed against the lower metal pipe. As a result, a uniform bonding pressure can be applied to the interface between the bonded surfaces.

BRIEF DESCRIPTION OF THE DRAWINGS

In the accompanying drawings:

FIGS. 7A to 7C are diagrams showing a process for diffusion-bonding metal pipes by the vertical diffusion bonding apparatus shown in FIG. 1;

FIGS. 8A to 8C are diagrams showing continuation of the process shown in FIG. 7;

FIGS. 10A and 10C are diagrams showing a process for diffusion-bonding metal pipes by using the vertical diffusion bonding apparatus shown in FIG. 9; and FIGS. 11A to 11C are diagrams showing continuation of the process shown in FIG. 10.

PREFERRED EMBODIMENTS OF THE INVENTION

Figure 1:
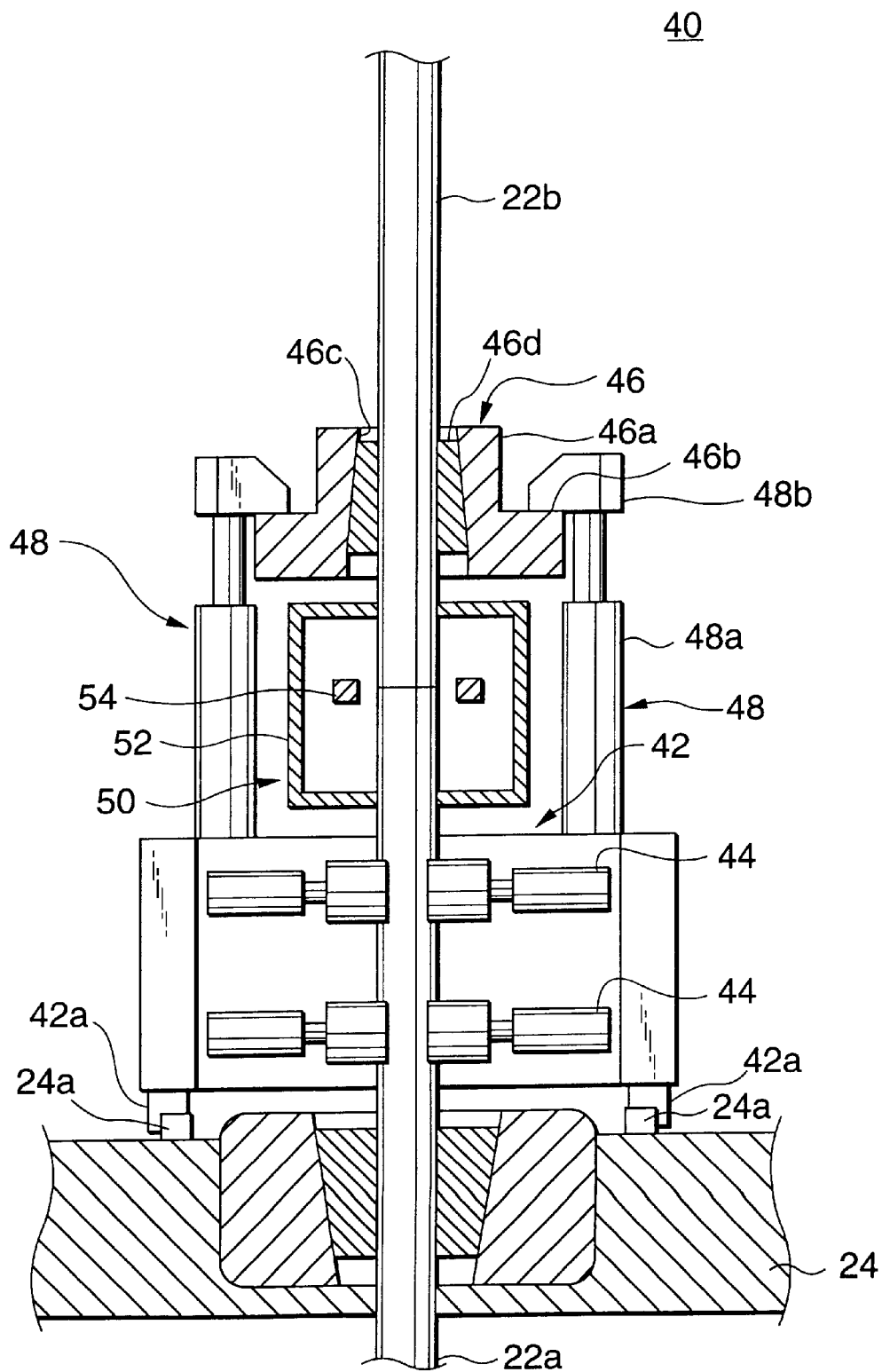
FIG. 1 is a schematic structural view showing a vertical diffusion bonding apparatus according to the present invention.

Preferred embodiments of the present invention will now be described with reference to the accompanying drawings. FIG. 1 shows one embodiment of a vertical diffusion bonding apparatus according to the present invention. Referring to FIG. 1, a vertical diffusion bonding apparatus 40 is provided with a lower block 42, a pressurizing jig 46, a pressurizing mechanisms 48 and a heating mechanism 50.

The lower block 42 is arranged to hold the lower metal pipe 22a and includes clamping mechanisms 44 disposed vertically separated from each other a predetermined distance. Thus, the metal pipe 22a is held at two locations.

Figure 2:
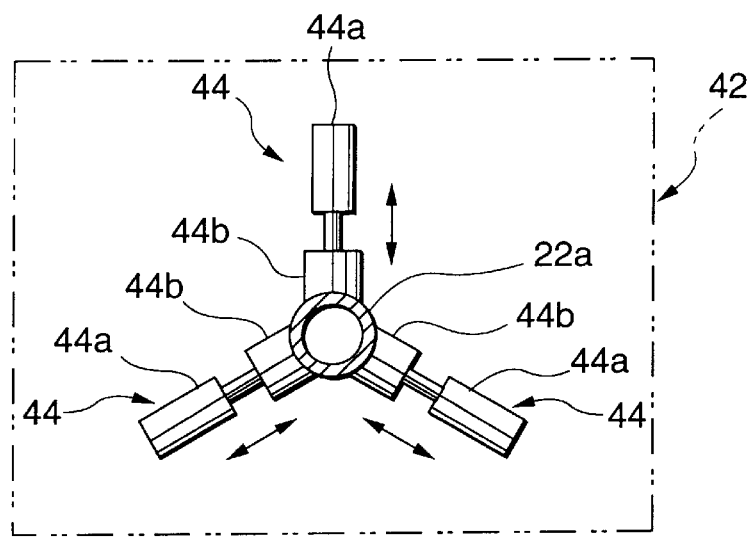
FIG. 2 is a plan view showing a clamping mechanism for use in the vertical diffusion bonding apparatus shown in FIG. 1.

As shown in FIG. 2, each of the clamping mechanisms 44 has three hydraulic cylinders 44a each having a clamping claw 44b disposed at the leading end thereof. The hydraulic cylinders 44a are horizontally disposed apart from one another at angular intervals of 120° around the metal pipe 22a. When the hydraulic cylinders 44a are extended/retracted to and from the metal pipe 22a, the clamping claws 44b are able to hold/release the metal pipe 22a.

The pressurizing jig 46 presses a metal pipe 22b which is supplied from an upper position against the metal pipe 22a which is held by the lower block 42, the pressurizing jig 46 incorporating a base frame 46a and an inner frame 46d.

The base frame 46a includes a horizontal flange portion 46b having a hat-like shape. An opening 46c having a truncated cone shape having a diameter which is progressively enlarged in the downward direction is formed in the central portion of the base frame 46a. The inner frame 46d has a truncated cone shape member having a cylindrical through hole in the central portion thereof. The inner frame 46d is accommodated in the opening 46c of the base frame 46a.

Figure 3A:
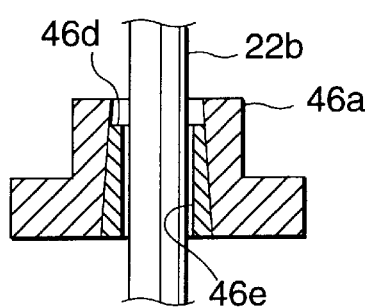
FIG. 3A is a front cross sectional view showing a pressurizing jig for use in the vertical diffusion bonding apparatus shown in FIG. 1 with the metal pipe released.
Figure 3B:
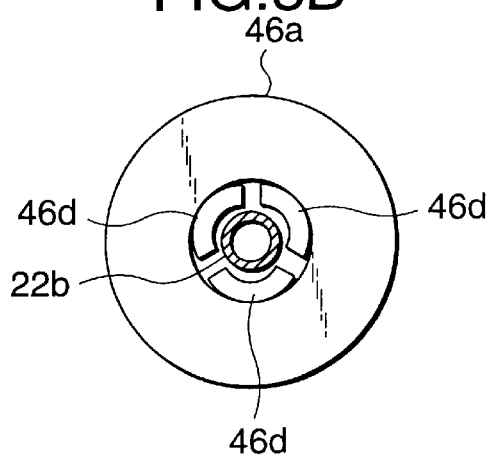
FIG. 3B is a bottom view of the pressurizing jig shown in FIG. 3A.

As shown in FIG. 3, the inner frame 46d is divided into three sections in the axial direction. The three sections are connected to one another by biasing means (not shown) so as to be urged in a direction in which a through hole 46e formed in the central portion of the inner frame 46d is opened.

Figure 4A:
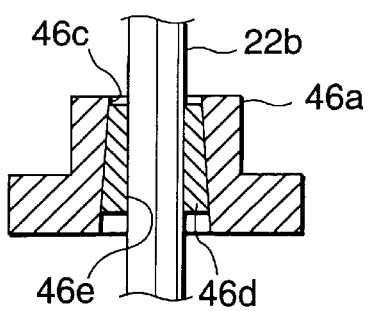
FIG. 4A is a vertical cross sectional view showing the pressurizing jig for use in the vertical diffusion bonding apparatus shown in FIG. 1 in a condition where the metal pipe is held.
Figure 4B:
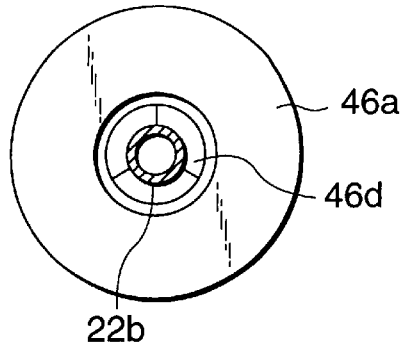
FIG. 4B is a bottom view of the pressurizing jig shown in FIG. 4A.

When the inner frame 46d has been moved downwards to the lower end of the base frame 46a, the through hole 46e formed in the central portion of the inner frame 46d is expanded, as shown in FIG. 3. Thus, insertion/removal of the metal pipe 22b to and from the inside portion of the through hole 46e is permitted. When the inner frame 46d is in a state in which the metal pipe 22b has been inserted is moved upwards along the opening 46c of the base frame 46a as shown in FIG. 4, the inner diameter of the through hole 46e is reduced. Thus, the metal pipe 22b is held in the through hole 46e.

The pressurizing mechanisms 48 draws the pressurizing jig 46 bonded to the metal pipe 22b toward the lower block 42 to press the metal pipe 22b against the metal pipe 22a.

Each of the pressurizing mechanisms 48 is provided with hydraulic cylinders 48a and an engaging claw 48b disposed at the leading end of the hydraulic cylinders 48a. As shown in FIG. 5 which is a plan view, four pressurizing mechanisms 48 are mounted vertically on the upper portion of the lower block 42. The pressurizing mechanisms 48 are disposed around the metal pipe 22b.

Figure 5A:
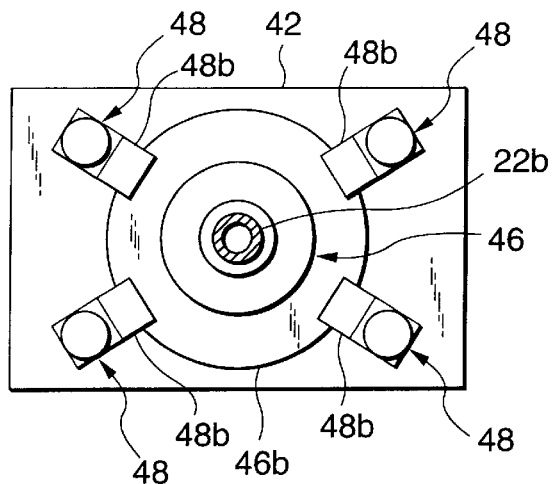
FIG. 5A is a plan view showing a pressurizing mechanism for use in the vertical diffusion bonding apparatus shown in FIG. 1 where the pressurizing jig has been engaged by an engaging claw.
Figure 5B:
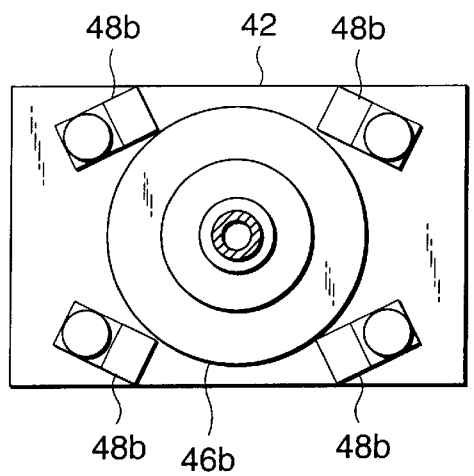
FIG. 5B is a plan view showing a condition in which engagement has been released.

Each engaging claw 48b is rotatable horizontally. Therefore, when the pressurizing jig 46 is to be drawn toward the lower block 42, the metal pipe 22b, to which the pressurizing jig 46 is fitted, is set at a predetermined position, as shown in FIG. 5A. Then, each engaging claw 48b is moved to face the metal pipe 22b. As a result, the flange portion 46b of the pressurizing jig 46 which is secured to the metal pipe 22b can be reliably engaged by the engaging claws 48b. When the pressurizing jig 46 is moved upwards/downwards, the engaging claws 48b are turned to the outside of the flange portion 46b of the pressurizing jig 46, as shown in FIG. 5B.

The heating mechanism 50 is provided within a shield chamber 52 for maintaining a predetermined atmosphere in the vicinity of the interface between the surfaces to be bonded and a heating coil 54 for induction-heating an area in the vicinity of the interface between the metal pipes 22a and 22b is also provided. The shield chamber 52 and the heating coil 54 can be divided into two sections in the horizontal direction. Each of the divided sections is able to move to the right and left in the horizontal direction.

Figure 6A:
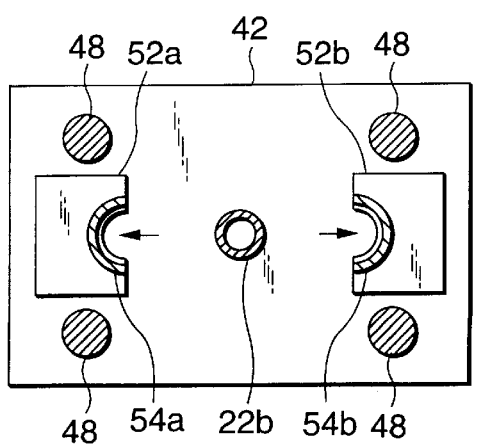
FIG. 6A is a plan view showing a state in which the heating mechanism for use in the vertical diffusion bonding apparatus shown in FIG. 1 has been divided and moved to the right and left in horizontal directions.

Therefore, when the metal pipe 22b is moved upwards/downwards, a left-hand member 52a of the shield chamber 52 and a left-hand member 54a of the heating coil 54 are horizontally moved in the left-hand direction, as shown in FIG. 6A which is a plan view. Moreover, a right-hand member 52b of the shield chamber 52 and a right-hand member 54b of the heating coil 54 are horizontally moved in the right-hand direction.

Figure 6B:
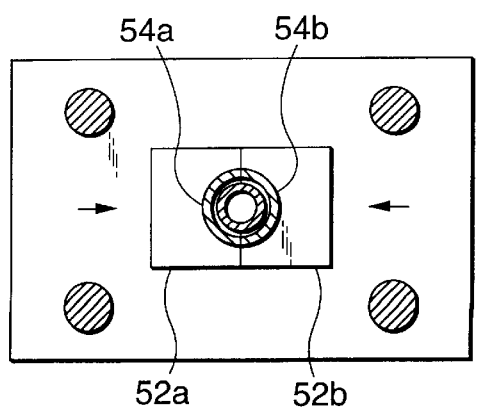
FIG. 6B is a plan view showing a condition in which the heating mechanism has been jointed together.
Figure 9:
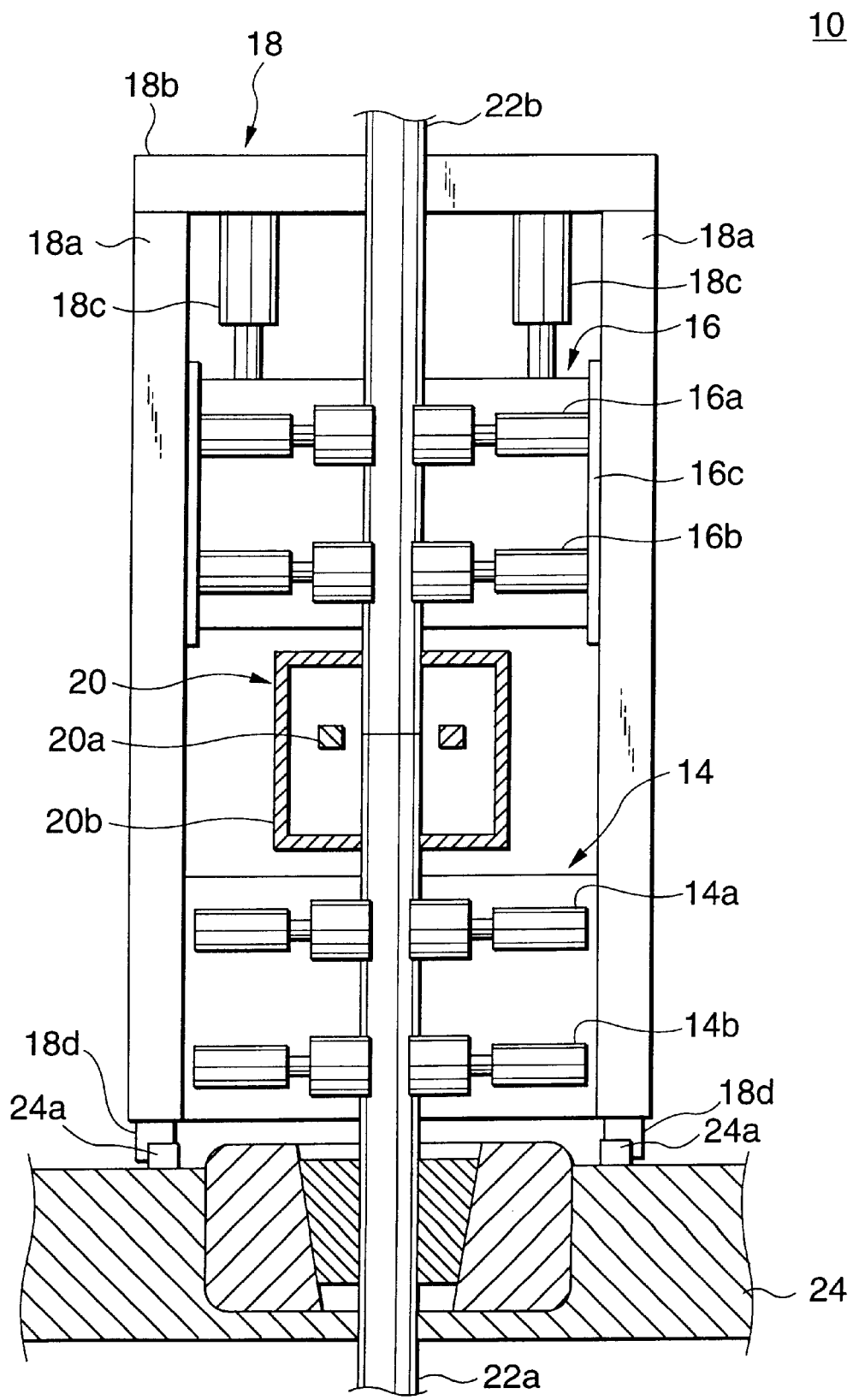
FIG. 9 is a schematic structural view showing a conventional vertical diffusion bonding apparatus.

When the interface between the bonded surfaces is heated, a left-hand member 52a of the shield chamber 52 and a left-hand member 54a of the heating coil 54 are horizontally moved in the right-hand direction, as shown in FIG. 6B. Moreover, the right-hand member 52b of the shield chamber 52 and the right-hand member 54b of the heating coil 54 are horizontally moved in the left-hand direction to join together the shield chamber 52 and the heating coil 54 with each other.

Wheels 42a are provided at the lower end of the lower block 42 to permit forward/rearward movement of the overall body of the vertical diffusion bonding apparatus 40 along the rails 24a provided for the base frame 24.

If either one of end surfaces of the metal pipe 22a and the metal pipe 22b has a flaw, such as a nick, a void is formed in the interface between the bonded surfaces. In this case, a satisfactory bonded state cannot always be realized. Therefore, an end-surface finishing machine for flattening the end surface of the metal pipe 22a and/or the metal pipe 22b may be provided.

A procedure for bonding the metal pipes 22a and 22b to each other by using the vertical diffusion bonding apparatus 40 structured as shown in FIG. 1 will now be described. As shown in FIG. 7A which is a side view, the vertical diffusion bonding apparatus 40 is rearwards (in the right-hand in FIG. 7A) retracted along the rails 24a provided by the base frame 24.

Then, the metal pipe 22a held by the tube clamp 26 is moved downwards to a predetermined position by using the crane 28 so it can be held by the tube clamp 30 secured to the base frame 24. Similarly to the pressurizing jig 46, each of the tube clamps 26 and 30 is provided with a base frame having a truncated cone opening and inner frame having a shape in the form of a truncated cone shape. Thus, the tube clamps 26 and 30 are able to hold/release the metal pipes 22a and 22b.

Then, as shown in FIG. 7B, the pressurizing jig 46 is secured at a position adjacent to the leading end of the other metal pipe 22b to be bonded to the metal pipe 22a. Moreover, the tube clamp 26 which is holding the metal pipe 22a is moved so as to be secured at a position adjacent to the top end of the metal pipe 22b. Then, the crane 28 (not shown in FIG. 7B) is operated to move the metal pipe 22b from a position above the metal pipe 22a. At this time, the metal pipe 22a and the metal pipe 22b are not brought into contact with each other, that is, a predetermined gap is maintained.

Then, as shown in FIG. 7C, the metal pipes 22a and 22b are moved to the central portion of the vertical diffusion bonding apparatus 40 by moving (in the left-hand direction in FIG. 7C) the vertical diffusion bonding apparatus 40 forward along the rails 24a. At this time, the heating mechanism 50 is opened in the lateral direction as shown in FIG. 6A. Therefore, the vertical diffusion bonding apparatus 40 can be moved forwards without any interference with the metal pipes 22a and 22b.

Then, as shown in FIG. 8A which is a front view, while the metal pipe 22b is held suspended by the crane 28 (not shown in FIG. 8A), the hydraulic cylinders 48a mounted on the upper surface of the lower block 42 are extended to position the engaging claws 48b disposed at the leading ends of the hydraulic cylinders 48a above and into engagement with the flange portion 46b of the pressurizing jig 46. Then, the crane 28 (not shown in FIG. 8A) is moved downwards to move the metal pipe 22b downward. Moreover, the hydraulic cylinders 48a are contracted so that the pressurizing jig 46 is drawn toward the lower block 42, whereby the metal pipe 22b is pressed against the metal pipe 22a.

At this time, the position of the metal pipe 22b suspended by the crane 28 (not shown in FIG. 8A) is maintained. Therefore, the metal pipe 22b is drawn toward the lower block 42 in a condition in which horizontal movement of the metal pipe 22b relative to he lower pipe 22a is permitted.

Therefore, if the axes of the metal pipe 22a and the metal pipe 22b are slightly misaligned from each other in the horizontal direction when the metal pipe 22b is drawn against the metal pipe 22a, only the metal pipe 22b needs to be horizontally moved. Thus, adjustment of the relative horizontal positions of the pipes can easily be performed.

Note that the adjustment of the horizontal position may be performed visually or by a manual operation. As an alternative to this, an appropriate guiding jig may be employed which guides the metal pipe 22b to ensure the axes of the metal pipe 22a and the metal pipe 22b coextend with each other.

Since the upper end of the metal pipe 22b is suspended by the crane 28 (now shown in FIG. 8A) a freedom of motion is permitted for adjusting the inclination of the axis of pipe 22b. Therefore, if the axes of the metal pipe 22a and the metal pipe 22b are slightly inclined from each other and the interface between the bonded surfaces is in a non-uniform contact state, the slight inclination can automatically be canceled by operating the four hydraulic cylinders 48a with uniform hydraulic pressures. Therefore, the bonding pressure can uniformly be applied to the interface between the bonded surfaces.

When a liquid phase diffusion bonding operation using an insertion member is performed, the predetermined insertion member is inserted into the interface between the bonded surfaces before the metal pipe 22b is pressed against the metal pipe 22a. When the solid phase diffusion bonding operation is performed, the metal pipe 22b is directly pressed against the metal pipe 22a without performing insertion of the insertion member. If the end surfaces of the metal pipes 22a and 22b have flaws, such as nicks, the end surface finishing machine is operated to flatten the end surfaces of the metal pipes 22a and 22b before the metal pipe 22b is pressed against the metal pipe 22a.

Then, as shown in FIG. 8B, the two-piece heating coil 54 is disposed around the interface between the bonded surfaces. Then, the portion in the vicinity of the interface between the bonded surfaces is covered with the shield chamber 52. Then, purging using inert gas is performed. When high frequency waves are applied to the heating coil 54, the interface between the bonded surfaces is heated to a predetermined temperature so that the metal pipes 22a and 22b are diffusion-bonded to each other.

After a predetermined time has elapsed and thus the temperature of the interface between the bonded surfaces has sufficiently been lowered, the shield chamber 52 and the heating coil 54 are removed. Then, the hydraulic cylinders 48a are extended to remove the engaging claw 48b attached to the leading end of the hydraulic cylinders 48a from the flange portion 46b of the pressurizing jig 46. Then, the pressurizing jig 46 is removed from the metal pipe 22b, and then the clamping mechanisms 44 are released.

Finally, as shown in FIG. 8C which is a side view, the vertical diffusion bonding apparatus 40 is retracted rearwards (in the right-hand direction in FIG. 8C). Moreover, the tube clamp 30 secured to the base frame 24 is released while the upper portion of the bonded metal pipe 22b is held by the tube clamp 26. Then, the crane 28 is operated to move the metal pipe 22b downwards to a predetermined position. Then, the tube clamp 30 is used to secure the metal pipe 22b. As a result of the above-mentioned process, one cycle of the bonding operation is completed. When the metal pipes are to be bonded sequentially to produce a length of thousands of meters, the processes shown in FIGS. 7A to 8C are repeated.

As described above, the vertical diffusion bonding apparatus according to the present invention is different from the conventional vertical diffusion bonding apparatus in that the upper block for holding the metal pipe which is supplied from an upper position can be omitted from the structure. Therefore, the overall structure of the apparatus can be simplified. When the metal pipes are diffusion-bonded to each other, the adjustment of the horizontal position and inclination of the metal pipe which is supplied from an upper position can be facilitated. Although the present invention has been described in its preferred form and structure with a certain degree of particularity, it is understood that the present disclosure of the preferred form can be changed in the details of constructions and in the combination and arrangement of parts without departing from the spirit and the scope of the present invention.

For example, the while three hydraulic cylinders disposed at the angular intervals of 120° to serve as the clamping mechanisms 44 which are provided for the lower block 42 are described, two hydraulic cylinders may be disposed opposite to each other. Four or more hydraulic cylinders may be disposed at the same intervals.

In the foregoing embodiment, the four pressurizing mechanisms 48 are mounted vertically on the lower block 42. Alternatively, three pressurizing mechanisms may be symmetrically disposed at angular intervals of 120°. Two or five or more pressurizing mechanisms 48 may symmetrically be disposed also. If the number of the pressurizing mechanisms 48 is two, the pressurizing jig 46 is sometimes unstable when the pressurizing jig 46 is drawn toward the lower block 42. Therefore, it is preferable that the number of the pressurizing mechanisms 48 is three or more.

In the foregoing embodiment, the pressurizing mechanisms 48 are secured to the upper surface of the lower block 42. The pressurizing mechanisms 48 may be structured such that outward inclination of each of the pressurizing mechanisms 48 is permitted. In such case, the metal pipe to which the pressurizing jig is secured or connected is moved upwards/downwards in a condition in which the pressurizing mechanisms 48 is inclined outwardly. When the engaging claw is engaged to the pressurizing jig, the pressurizing mechanisms 48 are positioned vertically.

In the foregoing embodiment, the high-frequency induction heating apparatus incorporating the heating coil 54 is employed as the heating mechanism 50. Another heating means, such as a direct-power-supply heating apparatus or a resistance heating apparatus, may be employed as the heating mechanism 50 to obtain an effect similar to that obtainable from the above-mentioned embodiment.

The vertical diffusion bonding apparatus according to the present invention has the structure that the lower metal pipe is held by the lower block. Moreover, the pressurizing jig is attached to the metal pipe which is supplied from an upper position. The pressurizing mechanism mounted on the lower block is operated to attract the pressurizing jig toward the lower block. Thus, the metal pipe which is supplied from an upper position is pressed against the lower metal pipe. Therefore, the upper block for holding the metal pipe which is supplied from an upper position can be omitted from the structure. Therefore, an effect can be obtained in that the overall structure of the vertical diffusion bonding apparatus can be simplified.

The metal pipe which is supplied from an upper position is not fixed in the horizontal direction. The foregoing metal may be drawn toward the lower block by the pressurizing cylinder. Consequently, an effect can be obtained in that the adjustment of the horizontal position can be facilitated when the metal pipe which is supplied from an upper position and the lower metal pipe are abutted against each other.

The direction of the axis of the metal pipe which is supplied from an upper position is not fixed. Therefore, slight inclination of the interface between the bonded surfaces of the metal pipe which is supplied from an upper position and the lower metal pipe can automatically be canceled when the metal pipe which is supplied from an upper position is pressed against the lower metal pipe and claws 48*b* engage flange 46*b*. Therefore, a uniform bonding pressure can be applied to the interface between the bonded surfaces.

As described above, according to the present invention, a vertical diffusion bonding apparatus which enables easy adjustment of the horizontal position and inclination of the metal pipe which is supplied from an upper position is provided at a low cost. Therefore, when the apparatus according to the present invention is applied to diffusion bonding of oil well tubes, the oil drilling, tubing operation can be performed at a low cost with a satisfactory efficiency. Therefore, the present invention attains a great industrial effect.

What is claimed is:

1. A vertical diffusion bonding apparatus wherein metal pipes are supplied from an upper position to a lower position, said vertical diffusion bonding apparatus comprising:

a lower block (42) for holding a lower metal pipe at a lower position;

a pressurizing jig (46, 48) attachable to an upper metal pipe supplied from an upper position, the pressurizing jig being supported solely by the lower block and further wherein said pressurizing jig and lower block are horizontally movable while the pressurizing jig is attached to an upper metal pipe, and a pressurizing mechanism provided on said lower block arranged so as to engage and draw said pressurizing jig toward said lower block while the pressurizing jig is attached to an upper metal pipe.

2. The vertical diffusion bonding apparatus according to claim 1, said pressurizing mechanism including engaging claws, and said pressurizing jig comprising a horizontal flange member engageable vertically by the engaging claws and a central annular opening extending in a vertical direction perpendicular to the flange member for receiving an upper metal pipe.

3. The vertical diffusion bonding apparatus according to claim 2, including a pipe engaging device disposed in said opening for detachably coupling said pressurizing jig with an upper metal pipe.

4. The vertical diffusion bonding apparatus according to claim 1, including a lower base frame (24), said lower block (42) mounted on said base frame for horizontal movement relative thereto.

* * * * *